United States Patent
He et al.

(10) Patent No.: US 10,400,129 B2
(45) Date of Patent: Sep. 3, 2019

(54) METHOD AND COMPOSITE FOR PREPARING HEAT EXCHANGERS FOR CORROSIVE ENVIRONMENTS

(71) Applicant: HER MAJESTY THE QUEEN IN RIGHT OF CANADA as represented by THE MINISTER OF NATURAL RESOURCES, Ottawa (CA)

(72) Inventors: Youliang He, Ancaster (CA); Jason Sin Hin Lo, Toronto (CA); Raul Santos, Burlington (CA)

(73) Assignee: HER MAJESTY THE QUEEN IN RIGHT OF CANADA AS REPRESENTED BY THE MINISTER OF NATURAL RESOURCES, Ottawa, Ontario (CA)

( * ) Notice: Subject to any disclaimer, the term of this patent is extended or adjusted under 35 U.S.C. 154(b) by 44 days.

(21) Appl. No.: 14/415,136

(22) PCT Filed: Jun. 18, 2013

(86) PCT No.: PCT/CA2013/000580
§ 371 (c)(1),
(2) Date: Jan. 15, 2015

(87) PCT Pub. No.: WO2014/012161
PCT Pub. Date: Jan. 23, 2014

(65) Prior Publication Data
US 2016/0046820 A1    Feb. 18, 2016

Related U.S. Application Data

(60) Provisional application No. 61/672,375, filed on Jul. 17, 2012.

(51) Int. Cl.
*F28F 13/18* (2006.01)
*C09D 127/12* (2006.01)
(Continued)

(52) U.S. Cl.
CPC ............ *C09D 127/12* (2013.01); *B05D 1/06* (2013.01); *B05D 3/002* (2013.01); *C09D 5/24* (2013.01);
(Continued)

(58) Field of Classification Search
CPC .. F28F 13/18; F28F 19/02; F28F 19/04; F28F 2245/06; F28F 13/182; F28D 21/0003;
(Continued)

(56) References Cited

U.S. PATENT DOCUMENTS 3,597,720 A * 8/1971 Burgess ................... H01C 1/12
338/202
3,655,610 A * 4/1972 Vasta ................... C09D 127/18
427/375

(Continued)

FOREIGN PATENT DOCUMENTS

CA          1185731 A1    4/1985
CA          2527936 A1    12/2004

OTHER PUBLICATIONS

Patent Cooperation Treaty, International Search Report and Written Opinion for International Application No. PCT/CA2013/000580, dated Sep. 17, 2013, 10 pages.

*Primary Examiner* — Claire E Rojohn, III
(74) *Attorney, Agent, or Firm* — Hoffman Warnick LLC

(57) ABSTRACT

An apparatus protected by corrosion resistance coating, said apparatus comprises an enclosure and heat exchanging elements contained therein wherein the heat exchange element and the enclosure are coated with fluoropolymer composites filled with thermally conductive and thermally insulating fillers, respectively. The composites contain: i) at least one fluoropolymer, and in a preferred embodiment the fluoropolymer is perfluoroalkoxy (PFA), and ii) at least one thermally conductive or insulating filler, and in a preferred embodiment the thermally conductive filler is graphite and (Continued)

the thermally insulating filler is carbon black. The thermally conductive filler is added to the coating for heat exchange elements, e.g. tubes, plates, fins, etc., to enhance heat transfer, while the thermally insulating filler is added to the coating for enclosures, e.g. shell, tube sheets, etc., to reduce the heat transfer to the environment.

11 Claims, 9 Drawing Sheets

(51) Int. Cl.
    *C09D 127/18*     (2006.01)
    *C09D 5/24*     (2006.01)
    *F28F 19/04*     (2006.01)
    *F28D 21/00*     (2006.01)
    *B05D 1/06*     (2006.01)
    *B05D 3/00*     (2006.01)
    *C09D 7/61*     (2018.01)
    *F28D 7/16*     (2006.01)
    *C08K 3/04*     (2006.01)
    *C08K 5/54*     (2006.01)

(52) U.S. Cl.
    CPC .............. *C09D 7/61* (2018.01); *C09D 127/18* (2013.01); *F28D 21/0003* (2013.01); *F28F 13/182* (2013.01); *F28F 19/04* (2013.01); *C08K 3/04* (2013.01); *C08K 5/5403* (2013.01); *F28D 7/16* (2013.01)

(58) Field of Classification Search
    CPC ........... F28D 7/16; C09D 5/24; C09D 127/18; C09D 7/1216; C08K 3/04; C08K 5/5403
    USPC ......................... 165/10, 133, 134.1, 173, 185
    See application file for complete search history.

(56) References Cited

U.S. PATENT DOCUMENTS

| | | | | |
|---|---|---|---|---|
| 4,125,152 A * | 11/1978 | Kestner | ................... | B05D 1/62 165/133 |
| 4,591,700 A * | 5/1986 | Sopory | ................... | H01C 7/027 219/505 |
| 4,685,025 A * | 8/1987 | Carlomagno | .......... | H01C 1/016 338/22 R |
| 4,724,417 A * | 2/1988 | Au | ........................ | H05B 3/146 219/549 |
| 5,000,875 A * | 3/1991 | Kolouch | .............. | C08K 3/0033 252/511 |
| 5,036,903 A * | 8/1991 | Shook | ................... | F28F 19/02 165/111 |
| 5,115,077 A * | 5/1992 | Matsuo | .............. | C08G 65/4031 528/125 |
| 5,378,407 A * | 1/1995 | Chandler | ................. | C08K 7/06 252/512 |
| 5,472,044 A * | 12/1995 | Hall | ........................ | B01D 53/18 165/104.32 |
| 5,513,694 A * | 5/1996 | Cameron | .............. | C23F 13/005 165/134.1 |
| 5,547,610 A * | 8/1996 | Mortensen | ............... | H01B 1/22 252/514 |
| 5,742,223 A * | 4/1998 | Simendinger, III | ... | H01C 7/027 338/20 |
| 5,886,860 A * | 3/1999 | Chen | ..................... | H02H 3/025 361/106 |
| 5,933,311 A * | 8/1999 | Chen | ..................... | H02H 9/026 361/106 |
| 5,945,034 A * | 8/1999 | Handa | ................... | H01C 7/027 219/541 |
| 5,972,494 A * | 10/1999 | Janssens | ................ | B05D 5/083 106/14.05 |
| 6,061,545 A * | 5/2000 | Cerrah | ............... | G03G 15/2057 219/216 |
| 6,124,045 A * | 9/2000 | Soda | ..................... | C09D 127/12 428/500 |
| 6,137,669 A * | 10/2000 | Chiang | ..................... | G01K 3/14 361/103 |
| 6,157,528 A * | 12/2000 | Anthony | ................ | H01C 7/021 333/12 |
| 6,411,191 B1 * | 6/2002 | Shea | ........................ | H01C 7/13 338/22 R |
| 6,528,572 B1 * | 3/2003 | Patel | ........................ | C08K 3/04 524/495 |
| 6,533,955 B1 * | 3/2003 | Molnar | .................. | C08F 214/18 252/511 |
| 6,593,843 B1 * | 7/2003 | Becker | ................. | H01C 1/1406 338/22 R |
| 6,607,679 B2 * | 8/2003 | Handa | ..................... | H01C 7/027 219/541 |
| 6,673,416 B1 * | 1/2004 | Nishio | ...................... | C08J 7/047 428/141 |
| 6,854,176 B2 * | 2/2005 | Hetherton | ............. | H01C 1/1406 29/417 |
| 6,954,346 B2 * | 10/2005 | Anthony | ............ | H01R 13/6608 361/111 |
| 7,042,303 B2 * | 5/2006 | Anthony | ................ | H01G 2/065 257/E23.079 |
| 7,042,703 B2 * | 5/2006 | Anthony | .................. | H01G 4/35 257/E23.067 |
| 7,050,284 B2 * | 5/2006 | Anthony | ................ | H01G 4/012 361/118 |
| 7,160,591 B1 * | 1/2007 | Dodd | ..................... | B29C 43/003 428/34.1 |
| 7,321,485 B2 * | 1/2008 | Anthony | .................. | H01G 4/40 257/E23.114 |
| 7,336,468 B2 * | 2/2008 | Anthony | ................. | H01L 23/50 257/E23.079 |
| 7,371,459 B2 * | 5/2008 | Galla | ........................ | H01B 1/22 252/389.3 |
| 7,423,860 B2 * | 9/2008 | Anthony | ................ | H01G 4/012 257/E23.079 |
| 7,660,096 B2 * | 2/2010 | Golubovic | ............. | H01C 7/102 361/103 |
| 7,675,729 B2 * | 3/2010 | Anthony | ................... | H01G 4/35 361/118 |
| 7,920,045 B2 * | 4/2011 | Chandler | ............ | H01C 1/1406 338/22 R |
| 8,458,894 B2 * | 6/2013 | Chen | ........................ | H01C 7/027 29/612 |
| 8,519,817 B2 * | 8/2013 | Ishihara | ............. | C08G 18/0823 338/22 R |
| 8,603,365 B2 * | 12/2013 | Wu | ........................ | B05D 5/083 252/511 |
| 8,647,746 B2 * | 2/2014 | Wu | ........................ | B82Y 30/00 399/121 |
| 8,728,354 B2 * | 5/2014 | Bandyopadhyay | ....... | C08K 3/08 219/217 |
| 8,765,027 B2 * | 7/2014 | Lussey | ...................... | G01L 1/20 252/500 |
| 8,841,358 B2 * | 9/2014 | Heikkila | ................... | B60C 1/00 523/220 |
| 8,871,306 B2 * | 10/2014 | Niccolls | .................. | C23C 28/00 427/202 |
| 8,900,652 B1 * | 12/2014 | Caballero | ............. | A61L 31/048 427/2.3 |
| 9,054,094 B2 * | 6/2015 | Anthony | ............ | H01L 23/49822 |
| 2003/0151030 A1 * | 8/2003 | Gurin | ..................... | B82Y 10/00 252/502 |
| 2005/0080210 A1 * | 4/2005 | Jing | ........................ | C08F 14/18 526/242 |
| 2007/0043333 A1 * | 2/2007 | Kampa | ................... | A61L 29/085 604/523 |
| 2007/0144716 A1 * | 6/2007 | Doh | ........................ | B01D 63/02 165/158 |
| 2008/0015298 A1 * | 1/2008 | Xiong | ..................... | C08K 3/22 524/432 |

(56) References Cited

U.S. PATENT DOCUMENTS

| | | | | |
|---|---|---|---|---|
| 2009/0018244 | A1* | 1/2009 | Polastri | C08K 5/04 |
| | | | | 524/300 |
| 2010/0069558 | A1* | 3/2010 | Stanga | C08G 65/007 |
| | | | | 524/495 |
| 2010/0266790 | A1* | 10/2010 | Kusinski | B32B 1/08 |
| | | | | 428/34.6 |
| 2011/0139451 | A1* | 6/2011 | McKeen | C02F 1/02 |
| | | | | 166/267 |
| 2012/0034448 | A1* | 2/2012 | Liu | B05D 5/083 |
| | | | | 428/325 |
| 2012/0129982 | A1* | 5/2012 | Zipplies | C08F 14/18 |
| | | | | 524/58 |
| 2012/0171546 | A1* | 7/2012 | Tagawa | H01M 2/1094 |
| | | | | 429/120 |
| 2013/0105127 | A1* | 5/2013 | Postma | F28D 7/16 |
| | | | | 165/157 |
| 2014/0262183 | A1* | 9/2014 | Zafiris | F28F 21/062 |
| | | | | 165/173 |
| 2014/0272460 | A1* | 9/2014 | Howells | F28F 21/084 |
| | | | | 428/654 |
| 2015/0233588 | A1* | 8/2015 | Betts | F24F 3/147 |
| | | | | 62/271 |

* cited by examiner

METHOD AND COMPOSITE FOR PREPARING HEAT EXCHANGERS FOR CORROSIVE ENVIRONMENTS

FIELD OF THE INVENTION

The present invention relates generally to metal surface preparation and particularly to composite materials and method for preparing corrosion-resistant metal elements for heat exchangers that can withstand the conditions of a condensing environment and with good heat transfer efficiency, adequate strength, minimum thickness and low manufacturing costs.

BACKGROUND OF THE INVENTION

Many industrial processes, for example, chemical plants, petroleum refineries, bio-refineries, pulp and paper mills, produce large amounts of waste heat, i.e. heat that simply passes out of flue and stack gases, vent gases and combustion gases into the atmosphere. Most of the waste streams are liquid, gaseous, or a combination of both and have temperatures from slightly above ambient temperature to over 1100° C.

Capturing and reusing waste heat is an effective way to improve the overall energy efficiency of industrial processes. Typical heat recovery devices in industrial applications include recuperators, regenerators, economizers and waste heat boilers, all with heat exchangers. Although waste heat recovery technologies have already been employed in many industrial facilities to varying degrees, there exist technical and economic barriers which impede their wider application.

One of the less exploited waste heat resources is the low-temperature exhaust streams. It is estimated that about 60% of unrecovered waste heat has low quality, i.e., at temperatures below about 230° C. Although low-temperature waste heat has less thermal and economic value than high-temperature heat, it is ubiquitous and available in large quantities. Therefore, the total work potential of low-temperature waste heat is large and exceeds that of medium- and high-temperature waste heat together.

However, low-temperature waste heat is rarely recovered because exhaust streams need to be cooled below condensing temperatures to effectively recover both the sensible and latent heat, which causes severe corrosion problems on the heat recovery devices. Corrosive acids (e.g. $H_2SO_4$) with pH of about 2.2 and concentration as high as about 85% may form when dirty exhaust streams condense at temperatures below the acid and water vapour dew points. Heat exchangers made from low-cost materials (e.g. carbon steels) or even stainless steels, nickel-base alloys, etc., fail quickly due to the chemical attack on the heat exchanger surfaces. The high cost of exotic metals that can withstand the corrosive environments (e.g. tantalum, niobium, zirconium, titanium etc.) often prevents the economic employment of such devices for low-temperature waste heat recovery. Even the concept of forming a thin layer of the above-mentioned corrosion-resistant metals onto ferrous metals requires expensive and complicated coating techniques, which are not economically viable.

Combining the high corrosion resistance of polymers and the low-cost, high-strength and good thermal conductivity of steels is an intuitive approach to solving the problem. Many polymer coatings (e.g. phenolic and epoxy) have been applied onto metallic materials as barriers to protect the metals from chemical attack. However, in addition to their low thermal conductivity, these coatings have low application temperatures (below about 150° C.) and cannot be applied in higher temperature environments.

An existing technique was to utilize Teflon (polytetrafluoroethylene or PTFE) film to cover all heat exchanger surfaces contacting the flue gas and protect the heat exchanger from corrosion. PTFE is a fluoropolymer with excellent chemical inertness and a high application temperature of about 260° C., suitable for condensing heat exchangers in a relatively high temperature range. However, due to its extremely high viscosity after melting, PTFE would not flow at all and is thus not melt-processable, making it difficult to produce a pinhole-free protective layer with conventional coating methods.

As a result, although with excellent corrosion resistance, Teflon-covered heat exchangers have several disadvantages:
1) Teflon has very low thermal conductivity (~0.2 $Wm^{-1}K^{-1}$ as compared to ~400 $Wm^{-1}K^{-1}$ of copper), while the thickness of the Teflon film has to be >~0.4 mm (which is about half of the thickness of typical heat exchanger tubes) to avoid pinholes. Thus the heat transfer coefficient of the Teflon covered tubes is very low.
2) The covering film does not have a physical bond with the substrate tube, thus very high heat transfer resistance exists at the Teflon/tube interface, further reducing the heat transfer efficiency.
3) Only bare tubes can be covered by Teflon films, the result is that the total heat transfer area is limited and the overall heat recovery efficiency of Teflon-covered heat exchanger is very low.
4) Since a large amount of costly Teflon PTFE will be used in the heat exchanger and the process to manufacture the PTFE-covered heat exchanger is expensive, the overall cost of the condensing heat exchanger is high.

Therefore, there remains a need for a heat exchanger that can withstand the conditions of a condensing environment and with good heat transfer efficiency, adequate strength, minimum thickness and low manufacturing costs.

SUMMARY OF THE INVENTION

The present invention overcomes the shortcomings of existing prior art by providing a heat exchanger at least partly protected with a composite comprising at least one fluoropolymer and at least one thermally and/or electrically conductive filler.

It is an object of the present invention to provide methods and composite materials for preparing corrosion-resistant metal elements.

It is an object of the present invention to provide a corrosion-resistant condensing heat exchanger with relatively low manufacturing costs for flue gas waste heat recovery.

Another object of the present invention is to provide an environmentally friendly and cost effective method of manufacturing a condensing heat exchanger having the entire internal surfaces overlaid with corrosion-resistant fluoropolymer materials.

A further object of the present invention is to provide a corrosion-resistant condensing heat exchanger with its internal surfaces shielded with fluoropolymer composites of varying thermal conductivities: heat transfer surfaces being coated by composite fluoropolymer with enhanced thermal conductivity to increase heat transfer efficiency, and the other surfaces coated with fluoropolymer composite of low thermal conductivity to act as a barrier to reduce the heat loss to the outside of the heat exchanger.

Still a further object of the present invention is to provide a metal substrate with a fluoropolymer primer coat and a topcoat filled with thermally conductive substances applied thereto, which has enhanced thermal conductivity and will not suffer from corrosion damage during condensing heat exchanger operation.

These and other objects of the present invention are attained by a condensing heat exchanger made of low-cost ferrous metal, preferably low-grade stainless steel (e.g. 304 or 316), or carbon steel, and a process that uses tetrafluoroethylene/perfluoro (propyl vinyl ether) copolymer, also known as perfluoroalkoxy polymer (PFA), as both the primer layer and the topcoat applied onto the entire internal surfaces of the condensing heat exchanger, preferably by an electrostatic powder coating method. The present invention uses PFA as the coating material, taking advantage of its known excellent properties of corrosion resistance, high service temperature and melt-processibility. The PFA coatings for the heat transfer areas (e.g. tubes) and other surfaces (e.g. shells) selectively comprise thermally conductive fillers, preferably graphite, or thermally insulating fillers, e.g., carbon black, to fulfil different heat transfer requirements of these surfaces.

In accordance with one aspect of the present invention, there is provided a method of providing a metal element, comprising the steps of: (a) blending at least one fluoropolymer with at least one filler, said fluoropolymer being melt-processable, said filler enhancing thermal conductivity of said fluoropolymer; and (b) applying said blended fluoropolymer onto at least a portion of said metal element.

In accordance with another aspect of the present invention, there is provided a method of providing a heat exchanger, comprising the steps of: (a) blending at least one fluoropolymer with at least one filler, said fluoropolymer being melt-processable, said filler enhancing thermal conductivity of said fluoropolymer; and (b) applying said blended fluoropolymer onto at least a portion of said heat exchanger.

In accordance with another aspect of the present invention, there is provided a composite for coating at least a portion of a metal element, comprising at least one melt-processable fluoropolymer and at least one filler for enhancing thermal conductivity of said fluoropolymer.

In accordance with another aspect of the present invention, there is provided a composite for coating at least a portion of a heat exchanger, comprising at least one melt-processable fluoropolymer and at least one filler for enhancing thermal conductivity of said fluoropolymer.

In accordance with another aspect of the present invention, there is provided a component for use in a heat recovery device, at least a portion of said component being coated with a composite comprising at least one fluoropolymer and at least one filler for enhancing thermal conductivity of said fluoropolymer.

In accordance with another aspect of the present invention, there is provided a metal element comprising a corrosion-resistant polymeric coating, the polymeric coating comprising at least one layer comprising a blend of a melt-processable fluoropolymer material and at least one thermally conductive filler.

In accordance with another aspect of the present invention, there is provided a heat exchanger comprising a first portion coated with a first composite comprising at least one fluoropolymer and at least one filler, and a second portion coated with a second composite comprising at least one fluoropolymer and at least one filler, wherein said filler of said first composite is different from said filler of said second composite in thermal conductivity.

In accordance with another aspect of the present invention, there is provided a method of providing a corrosion-resistant polymeric coating to metal elements, the method comprising (a) selectively preparing surfaces of the metal elements to provide selected prepared surfaces; (b) preparing a supply of powdered melt-processable first fluoropolymer material; (c) providing particles of at least one thermally conductive filler and blending the particles into the first fluoropolymer material to produce a coatable product; (d) applying at least one coating layer of the coatable product to selected ones of the selected prepared surfaces; (e) applying heat to the at least one coating layer to produce a physically bonded coating of the coatable product on the selected prepared surfaces; (f) cooling the metal elements and the coating layers to a temperature of less than 30° C.; and (g) selectively repeating step (d) to provide additional coating layers over the at least one coating layer and selectively repeating steps (e) and (f) to the additional coating layers.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

Figure 1:
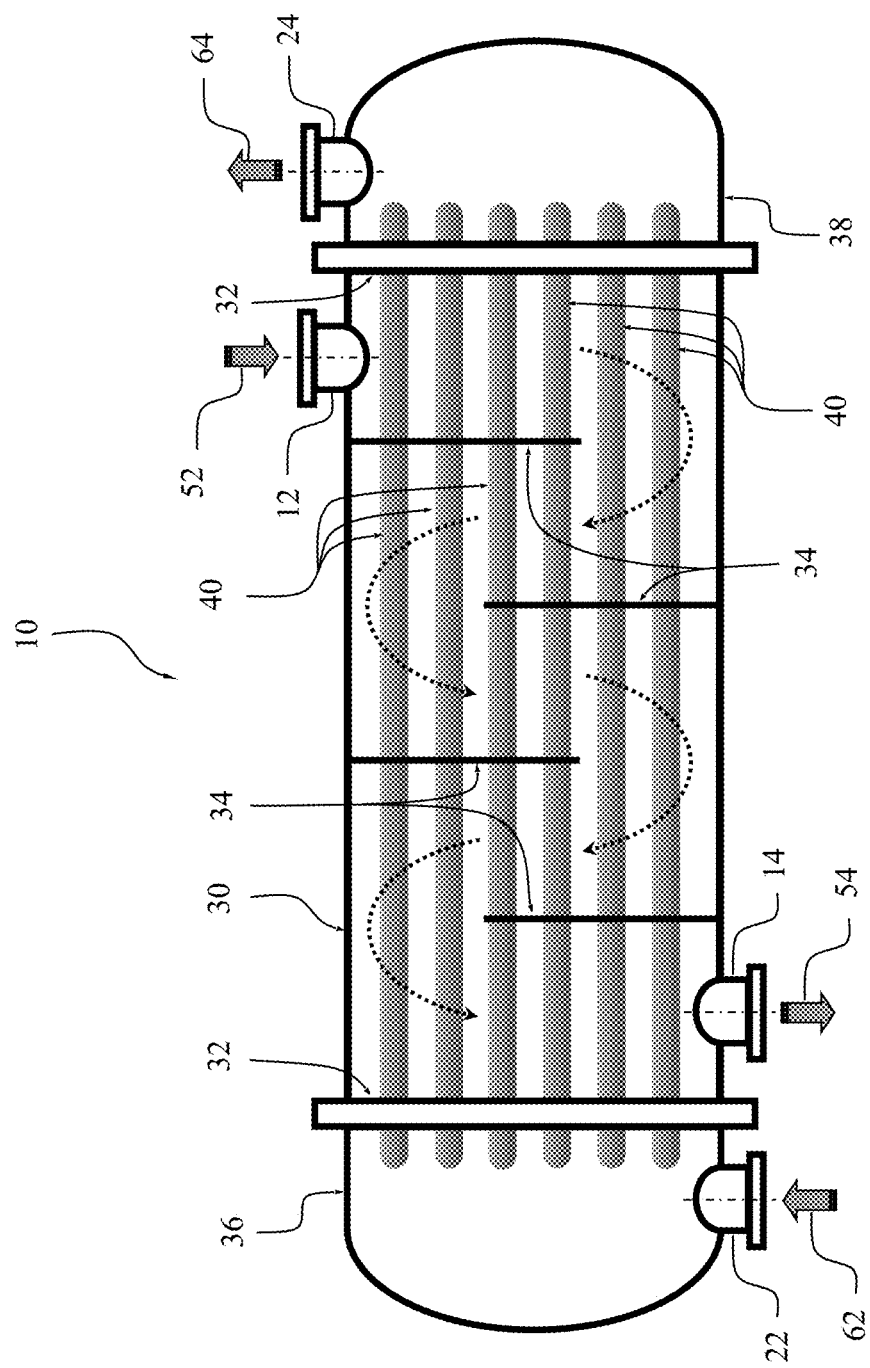
FIG. 1 is a schematic view of an illustrative embodiment of heat exchanger in accordance with the present disclosure.

The present invention will now be described with reference to the accompanying drawings, in which some, but not all embodiments of the invention are shown.

While some illustrative embodiments of the present invention are described in reference to heat recovery devices or heat exchangers, it is to be noted that the application of the present invention can be extended to protection or coating for any metal elements in any situation where corrosion resistance, high operating temperature and high thermal conductivity are simultaneously required.

The present invention addresses problems in the existing prior art and provides a solution to manufacturing highly corrosion resistant, highly efficient and cost effective heat exchangers. To overcome the drawbacks of Teflon (PTFE) cover used in the prior art, a number of polymers and other materials have been experimented and it was found that an alternative fluoropolymer, perfluoroalkoxy (PFA), was suitable to replace the PTFE as the protective outer layer.

In the context of providing condensing heat exchangers, some of the key considerations include corrosion resistance, heat transfer efficiency and cost associated therewith. Existing prior art (i.e. wrapping or covering the heat exchanger surfaces with Teflon films) helped address the corrosion problem, but left the other two unsolved, i.e., heat transfer efficiency is low and cost is high. The covering material (the Teflon film) is manufactured through a complex process because PTFE is not melt-processable (extremely high viscosity when melted) and is not able to form pinhole-free coating layer using conventional coating methods.

When selecting alternative coating materials for application in condensing heat exchangers, the method and embodiments according to the present invention take into consideration a number of factors, including but is not limited to:

1) It should be inert to most chemicals and resistant to corrosion in condensing environments;
2) It can tolerate a high temperature without degradation;
3) It can readily form a pinhole-free protective layer onto the metal substrate;
4) It is commercially available;
5) It preferably has a high thermal conductivity;
6) It is cost effective.

Some polymers can fulfill requirements 1), 3), 4) and 6), but most of them cannot meet requirements 2) and 5). PTFE and PFA have relatively high service temperature of about 260° C., among many commercially available fluoropolymers, but only PFA can readily form a pinhole-free coating layer using conventional coating methods. However, PFA is more expensive than PTFE and its thermal conductivity is also low, similar to PTFE and other fluoropolymers.

A number of exotic metals (e.g. Ta, Zr, Nb, etc.) that have excellent corrosion resistance to sulphuric acid have been tested. The corrosion resistant feature of these metals, however, only pertains at relatively low temperatures (about 150–205° C.) and the high costs of these materials and the associated coating techniques (e.g., CVD or PVD) preclude them as a cost-effective material for condensing heat exchangers.

Based on various experiments, the present invention identifies PFA as one of the preferred base materials.

It is also found that using thermally conductive fillers can enhance the thermal conductivity and reduce the overall material cost.

When selecting the filler material, the above-mentioned requirements are also considered. After examining a number of commercially available filler materials, it was found that graphite meets all the requirements and is therefore selected as a preferred additive in accordance with some illustrative embodiments of the present invention.

In addition to meeting the above requirements, both PFA and graphite have very low friction coefficient, an excellent feature for condensing heat exchangers as it greatly decreases the tendency of fouling and reduce the boundary layer drag, thus improves the overall thermal efficiency.

Various illustrative embodiments of the present invention below provide methods and composite materials for protecting or coating metal substrates.

In particular, various embodiments of the present invention provide methods and composites for protecting or coating a heat exchanger or metal elements thereof for use in industrial processes.

For example, in accordance with some embodiments, the method comprises the steps of blending at least one fluoropolymer with at least one filler, and applying the blended fluoropolymer onto at least a portion of the metal element.

In some preferred embodiments, the fluoropolymer is melt-processable, and the filler enhances the thermal conductivity of the fluoropolymer. In some other embodiments, the fillers comprise electrically conductive fillers for enhancing the electrical conductivity of the fluoropolymer.

In some illustrative embodiments, the composite disclosed herein for protecting at least a portion of a heat exchanger comprises at least one melt-processable fluoropolymer and at least one thermally conductive filler.

In some embodiments, the composite further comprises electrically conductive fillers for enhancing the electrical conductivity of the fluoropolymer.

Preferably, the composite comprises fillers that enhance both thermal conductivity and electrical conductivity of the fluoropolymer.

Preferably, the fluoropolymer comprises PFA.

Preferably, the thermal conductive filler comprises graphite.

Preferably, the blended fluoropolymer comprises about 10% to about 60% by weight of graphite.

Preferably, the fluoropolymer comprising PFA is provided in powder form.

In addition to PFA, a number of other fluoropolymers are available for corrosion-resistant applications. As indicated, PTFE is not melt-processable and cannot be coated using conventional methods.

Other melt-processable fluoropolymers include: FEP (a copolymer of tetrafluoroethylene and hexafluoropropylene), ETFE (a copolymer of ethylene and tetrafluoroethylene), PVDF (polyvinylidene fluoride), ECTFE (a copolymer of ethylene and chlorotrifluoroethylene) and PCTFE (polychlorotrifluoroethylene).

Preferably, the fillers are added to the fluoropolymer using a post-blending method. Post-blending simply mixes commercially available ingredient powders using a mechanical mixer, thus enables the user to freely select the additives and change the amount thereof, and to avoid the cost associated with customarily manufacturing a filled powder using pre-blending methods.

The thermal conductivity of the composite polymer is dependent on a number of parameters, including the filler content, shape, size, dispersion, orientation, etc. For coating application, suitable types may include particles, flakes, fibers and tubes, all in micrometer range. As such, in some illustrative embodiments, the thermal conductivity of the composite polymer is adjustable to meet the requirements for a particular application.

Referring to FIG. 1, there is shown an illustrative embodiment of a heat exchanger in accordance with the present disclosure. While in this example, a shell-tube heat exchanger 10 is illustrated, it is to be understood that the principles described herein are applicable to any other types of heat exchangers or heat recovery devices or any portion thereof that needs corrosion protection.

The example apparatus, e.g., a heat exchanger 10, as shown in FIG. 1, may comprise at least one enclosure, e.g., shell 30 and at least one heat exchanging element such as tube 40 disposed inside the shell 30. The shell side and the tube side can be separated by at least one tube sheet 32. One medium flows inside the tubes 40 while another medium flows outside the tubes 40 but inside the shell 30. Both media cross one another and exchange heat at a given temperature difference without mixing. The media usually liquid or gas. Heat exchanger 10 may comprise at least one tube inlet 22 at the shell section 36 for directing medium 62 into one or more tubes 40 and at least one tube outlet 24 at the shell section 38 for directing medium 64 out of tubes 40. Heat exchanger 10 may comprise at least one shell inlet 12 for directing medium 52 into shell 30 and at least one shell outlet 14 for directing medium 54 out of shell 30. Heat exchanger 10 may comprise at least one baffle 34 for directing flow through the shell portion 30 to facilitate thorough heat exchange.

In accordance with some example embodiments of the present disclosure, certain portions of heat exchanger 10 may be protected with corrosion resistant coating. The thermal conductivity of the coating varies according to the requirement for heat exchange. For example, the entirety of the external surfaces of the heat transmission/exchanging elements such as tubes 40, which may contain fins, should be coated with corrosion resistant and thermally conductive fluoropolymer coating. Thermally conductive fillers are added to enhance the heat transfer from outside the tubes 40 to the fluid inside the tubes 40. On the other hand, for those surfaces where heat transmission/exchanging needs to be reduced, for example, the entirety of the interior surfaces of the shell 30, the inner surfaces of tube sheets 32 and the entirety of the surfaces of baffles 34, the surfaces should be coated with the composite described herein with low thermal conductivity fillers, or without fillers. In these cases, pure PFA or PFA filled with low thermal conductivity additives can be applied to keep the heat inside the shell 30.

Figure 2:
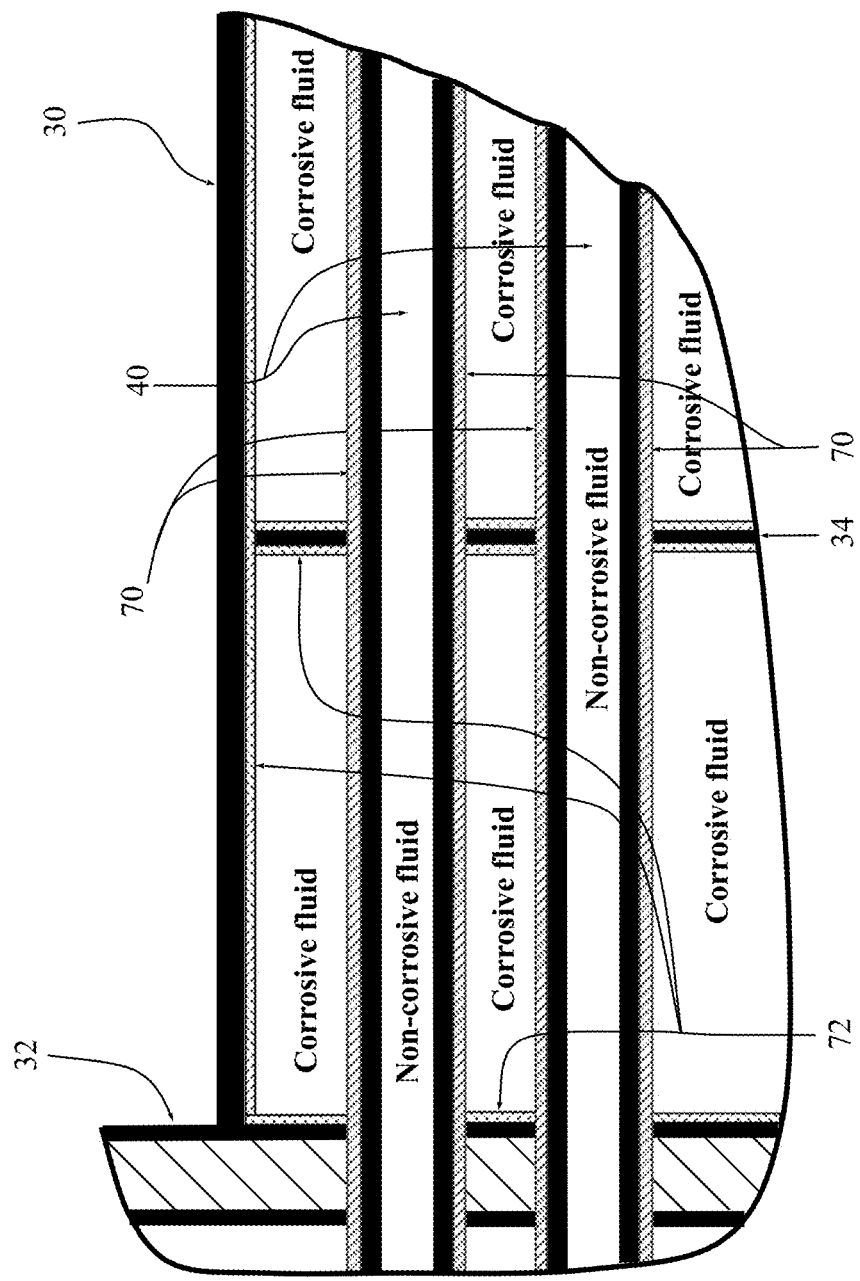
FIG. 2 is a cut-away view of a portion of an illustrative embodiment of heat exchanger in accordance with the present disclosure.

Referring to FIG. 2 and in accordance with some illustrative embodiments of the present disclosure, coating 70, which comprises a primer coating layer and a top layer consisting of at least one melt-processable fluoropolymer and at least one thermally conductive filler, is applied onto external surfaces of heat transmission/exchanging elements such as tubes 40. Comparing with coating 70, to protect internal surfaces of shell 30, tube sheets 32 and surfaces of baffles 34, coating 72 which comprises a primer layer and a top layer consisting of at least one melt-processable fluoropolymer or one melt-processable fluoropolymer filled with at least one lower thermal conductivity material will be used. In other words, the heat transfer surfaces are coated with thermal-conductivity-improved PFA composites to enhance the energy transport, while the other internal surfaces are shielded with virgin fluoropolymer, preferably PFA, or thermal-insulator-filled fluoropolymer to form a corrosion and heat transfer barrier to reduce the heat loss to the environment.

Accordingly, in some illustrative embodiments, the present disclosure provides a heat exchanger 10 comprising a first portion coated with a first composite comprising at least one fluoropolymer and at least one filler, and a second portion coated with a second composite comprising at least one fluoropolymer and at least one filler, wherein the filler of the first composite is different from the filler of the second composite in thermal conductivity.

Preferably, the protective coating is applied onto at least a portion of the heat exchanger 10 using an environmentally friendly electrostatic powder coating method. However, a person skilled in the art would appreciate that any other suitable coating method can also be used. For example, suitable coating methods include electrostatic spraying, brushing, powder dispersion spraying, fluidized bed coating, etc.

In some illustrative embodiments, it is preferable to have a thick coating (about 400 microns) on the tubes 40 to effectively protect the tubes from corrosion. In electrostatic powder spray, however, it can be difficult to obtain the required coating thickness in one spray, for example, for pure fluoropolymer, usually only about 50~100 microns can be applied each time. Since fluoropolymer is an insulator, it is also very difficult to apply additional layers onto existing coating. Advantageously, the addition of electrically and thermally conductive fillers to fluoropolymer not only makes the coating more thermally conductive, it also makes multiple sprays much easier, and thus achieves the preferred or desirable coating thickness.

Figure 3:
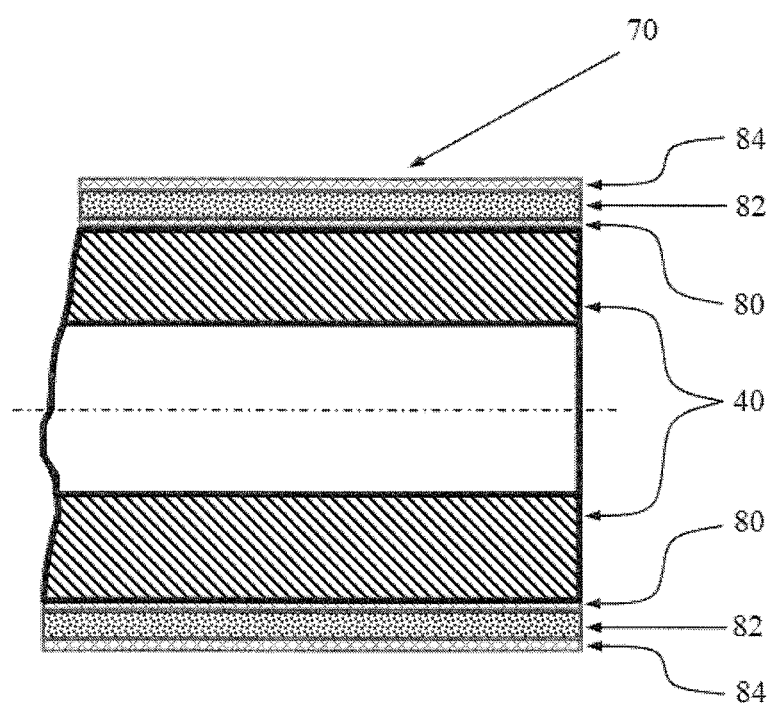
FIG. 3 is a cut-away view of a portion of a heat exchanging element of an illustrative embodiment of heat exchanger in accordance with the present disclosure.

Referring to FIG. 3, in some example embodiments, multiple layers of coating composite can be applied to heat exchanger 10. The layers of coating need not be identical in thickness, and need not comprise identical compounds, fluoropolymer, fillers, or weight percentage thereof. For example, in some embodiments, at least one layer comprises fluoropolymer or filler that is different in kind from that of at least another layer. In other embodiments, at least one layer comprises fluoropolymer or filler that is different in amount from that of at least another layer. In other words, the coating using the composites described herein can be repeated for predetermined times, with identical or differently prepared composites.

After applying the coating composite to a heat exchanger component or a portion thereof, the coating is subject to heating to melt and flow, and form physical bonding between the coating composite and the substrate. For example, baking of powder coating can take place at a temperature range of about 320° C. to about 350° C. for a period of about 0.5 to 4 hours.

Furthermore, the methods and composites described herein can be applied to a pre-processed heat exchanger or a portion thereof. For example, heat exchange 10 may be previously protected or coated with a layer of primer. In some illustrative embodiments, the primer may comprise at least one melt-processable fluoropolymer. In some other illustrative embodiments, the primer comprises PFA and any suitable binder or ingredient to enhance the adhesion to a substrate that is subject to coating. When used, the primer may be applied in any manner known in the art, including electrostatic powder coating methods.

In some illustrative embodiments, as shown in FIG. 3, the coating for heat exchanging tubes 40 may be applied in three different layers: 1) a primer 80, which enhances the adhesion to the metal substrate, 2) a highly conductive layer 82, which may contain a high amount of filler to improve the conductivity, and 3) a low conductivity layer 84, a thin layer that contains much less filler or no filler to keep a smooth top surface layer of pure PFA or slightly loaded PFA.

Advantageously, the present invention provides application of PFA onto metallic substrates to form a pinhole-free protective layer by means of electrostatic powder coating, by adding highly thermally conductive fillers into virgin PFA powder to improve the thermal conductivity, as well as applying the filled PFA powder onto various metallic substrates, including convoluted or finned tubes, outer or inner surfaces.

An advantage of the present invention is that by a simple and cost-favourable powder coating technique, a pinhole-free protective layer considerably thinner than a PTFE covering film is produced on the metallic tubes and a physical bond is created at the interface between the PFA and the tube, which makes the overall heat transfer coefficient much higher than a PTFE covered tube, the latter of which requires a thicker PTFE film to avoid pinhole and lacks physical bond at the interface.

Another advantage is that by adding thermally conductive fillers like graphite or ceramic powders/fibers/whiskers into virgin PFA, the thermal conductivity of the protective layer is significantly improved, thus the heat recovery efficiency is greatly increased. In addition, the use of graphite in the coating powder considerably reduces the amount of costly PFA powder to be used, reducing the material cost of the coating layer.

Yet another advantage is that, the thermally conductive additives are post-blended with commercial PFA powder by a simple tumbling method, not by customarily premixing the ingredients through a complex manufacturing procedure. This not only enables the user to freely select the additives and to avoid the cost associated with customarily manufacturing a filled powder, but also makes it easier to obtain more uniformly dispersed mixture by using advanced mixing techniques such as ultrasonic blending.

A further advantage is that by using the electrostatic powder coating method, it enables the coating of convoluted or finned tubes, outer or inner surfaces. This in turn enables a much larger heat transfer area with the same heat exchanger size, further increasing the overall heat recovery efficiency.

By reducing the thickness of the pinhole-free PFA coating compared to Teflon PTFE covering film, and by adding a considerable amount of graphite to the coating layer, the total amount of costly PFA material will be significantly reduced, thus the total cost of the heat exchanger will be reduced.

Various embodiments of the methods and composites disclosed herein can be applied to any metal elements in applications where corrosion-resistance is of importance.

In some illustrative embodiments of methods and composites disclosed herein, the at least one thermally conductive filler comprises at least one of graphite, carbon, and a ceramic powder.

In some other illustrative embodiments, the ceramic powder comprises silicon carbide, tungsten carbide, molybdenum disilicide, boron nitride, aluminum dioxide, chromium oxide, powdered quartz, cerium oxide, beryllium oxide, zirconium oxide, or silicon nitride.

In some further illustrative embodiments, the at least one thermally conductive filler is provided in an amount comprising between 10% and 60% by weight of the coatable product.

In some illustrative embodiments, the at least one thermally conductive filler is provided in an amount comprising at least 20% by weight of the coatable product.

In some further illustrative embodiments, the at least one thermally conductive filler is provided in an amount comprising at least 30% by weight of the coatable product.

In other illustrative embodiments, the at least one thermally conductive filler is provided in an amount comprising at least 40% by weight of the coatable product.

In some illustrative embodiments, the at least one thermally conductive filler is provided in an amount comprising at least 50% by weight of the coatable product.

In other illustrative embodiments, the at least one thermally conductive filler is provided in an amount comprising up to 60% by weight of the coatable product.

Various tests have been carried out for the methods and composites described herein. The following experiments illustrate the principles of the present invention by way of examples and without loss of generality.

EXPERIMENTAL

Surface Mechanical and Tribological Properties of the PFA Coatings
General

In order to characterize the mechanical properties and quality of the PFA coatings, instrumented indentation and scratch tests were conducted on three PFA-coated 304 stainless steel samples: 1) virgin PFA coating, no primer, thickness ~45 μm, 2) graphite-filled PFA coating, no primer, thickness ~60 μm, and 3) graphite-filled PFA coating, with primer, thickness ~195 μm. Wear testing was performed on the sample coated with graphite-filled PFA (without primer) to characterize the tribological properties of the coating after graphite filling. These tests were aimed to provide quantitative evaluations on the hardness, modulus, adhesion strength, scratch resistance and friction coefficient of the coated polymer layer.

Nano-Indentation Testing

Due to the softness and viscoelastic properties of polymeric materials, it is difficult to obtain meaningful data using conventional hardness testing methods to measure the hardness of a thin polymer film without effect from the substrate. Here, a nano-indentation tester with a Berkovich indenter was utilized to perform the hardness testing. During the test, the indenter was pressed into the coating surface, and the load and the penetration depth of the indenter were continuously monitored over the entire loading-unloading cycle. At least 5 indents per sample were conducted and the results were averaged.

A maximum load of 40 mN was applied to ensure that the penetration depth is less than ~10% of the coating thickness. After reaching the maximum load, a long pause time of 150 seconds was applied to account for the creep of the polymer coating. The recorded load-depth curves were then utilized to calculate the hardness and modulus of the coating layer using the Oliver-Pharr method.

Figure 4:
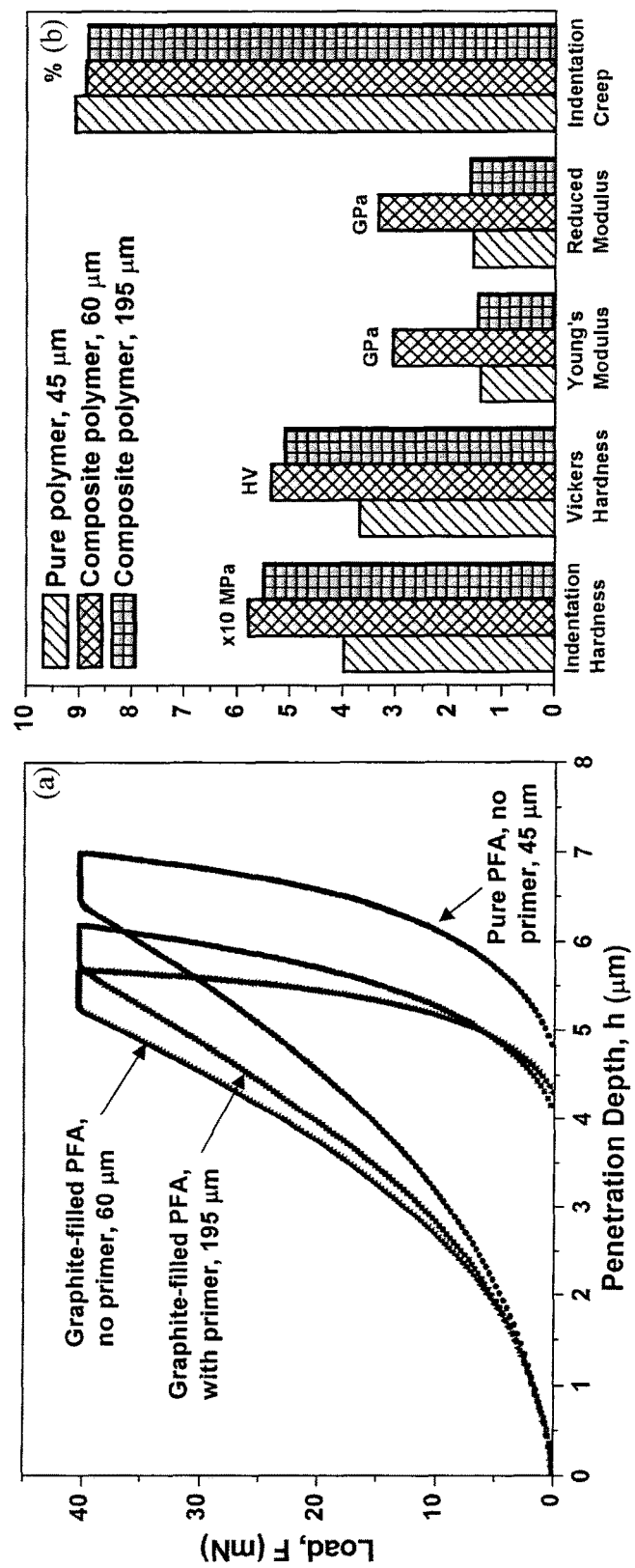
FIG. 4 illustrates nano-indentation results of the three tested samples, showing measured hardness, elastic modulus and other properties of the polymer coatings: (a) load-depth curves, (b) mechanical properties.

The load-depth curves and calculated hardness, elastic modulus and other properties of the three samples are shown in FIG. 4. By adding 10 wt % of graphite into the virgin PFA, the coating hardness is increased by 38~45%. The hardness measurements for the two graphite-filled samples were quite close, although the coating thicknesses are significantly different and one with primer and the other without. However, the measured elastic modulus of the two graphite-filled samples showed a large discrepancy. The modulus of the thicker coating (with a 55 μm primer layer) is close to that of the pure PFA coating, while the modulus of the thinner graphite-filled PFA coating without primer is twice that of the pure PFA coating. This may be due to the larger coating thickness and the additional primer layer of the thicker sample, since during the indentation testing, both the substrate and the coating contribute to the support of the indenter load. A thicker coating and a soft sub-layer causes a much lower modulus measurement. It is also clear that the measured indentation creep of the three samples is very close.

Scratch Testing

Scratch tests were conducted on the three samples using a scratch tester with a 200 µm Rockwell indenter. During the test, the indenter passed the exact same path three times: a pre-scan to measure the topography of the undamaged coating, a scratch into the coating to make the track and a post-scan to measure the topography of the deformed surface. A constant normal force of 0.9 N was used for both the pre-scan and post-scan. A linear progressive load from 0.9 to 80 N was applied at a loading rate of 80 N/min (or 3 mm/min) to make the scratches. During each scratch, the applied normal force (Fn), the frictional force (or tangential force, Ft), the vertical displacement into the coating and the acoustic emission associated with the scratch were recorded. The penetration depth (Pd) and the residual depth (Rd) were then calculated by subtracting the pre-scan topography from the vertical displacement and the post-scan topography, respectively. These signals, together with the microscopic examination of the scratch tracks, were then used to evaluate the adhesion strength and identify the damage modes.

Figure 5:
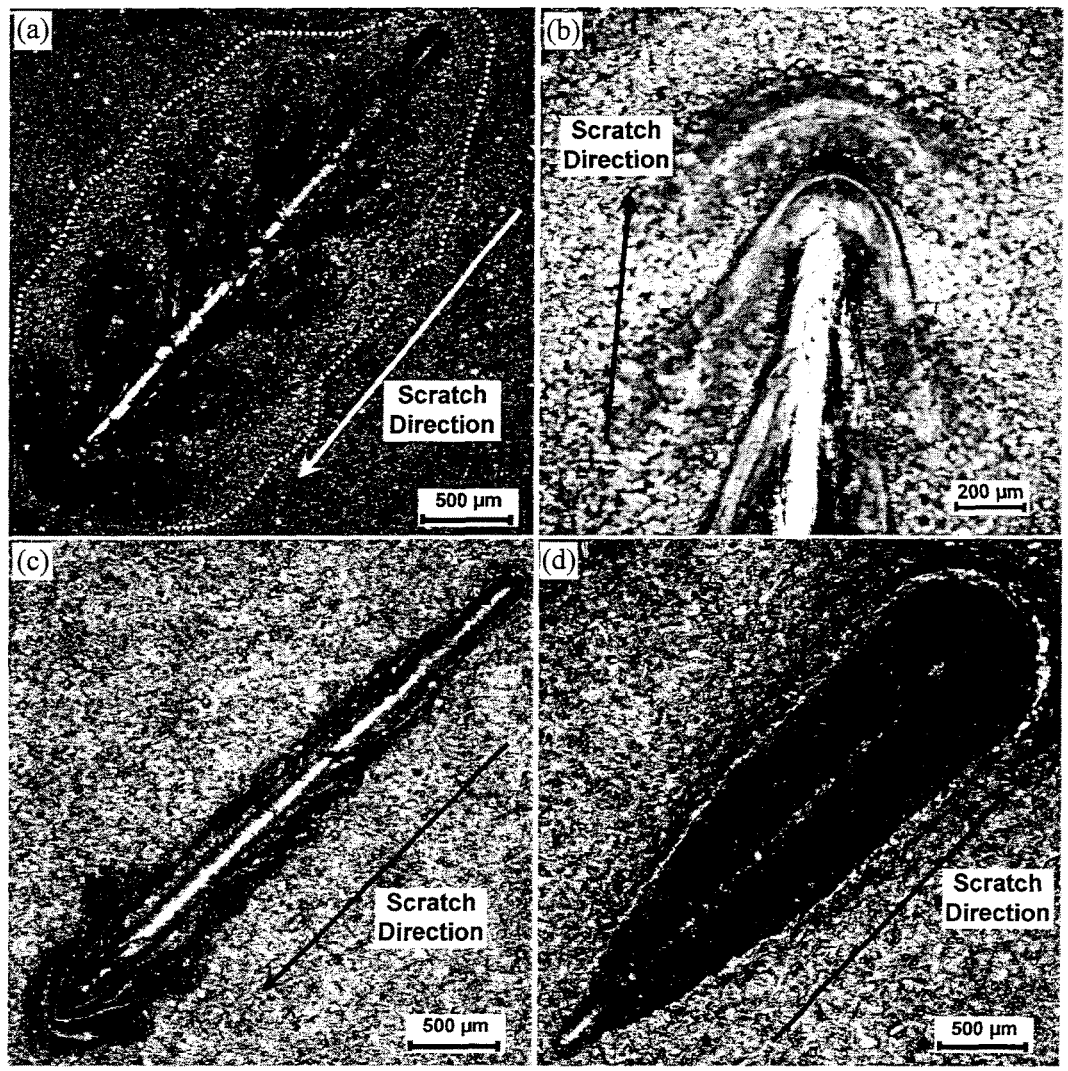
FIG. 5 illustrates progressive load scratches made on PFA-coated stainless steel: (a) pure PFA coating, without primer (45 μm), (b) a close-up view of the end of the scratch on the pure PFA coating, (c) filled PFA coating, without primer (60 μm), and (d) filled PFA coating, with primer (195 μm)

FIG. 5 illustrates examples of the scratch tracks obtained from the three samples. Significantly differentiated scratch behaviors are noticed in the samples tested, due to the differences in coating material (virgin or filled PFA), coating thickness and the presence/absence of a primer layer. Since PFA is a relatively soft polymer with exceptional low friction coefficient, no apparent cracking or rupture was observed along the tracks. However, apparent grooves and material pile-ups were observed along the sides of the tracks and ahead of the indenter.

The pure PFA coating has the lowest adhesion strength among the three samples: it was found that the coating layer around the track (within ~1 mm as outlined in FIG. 5a) was completely delaminated after scratching. Due to the softness of PFA, the delaminated coating material around the track region was dragged by the indenter toward the scratch direction, forming periodical material pile-ups. A close look-up of the scratch end is illustrated in FIG. 5b, where the material pile-ups are clearly shown.

The graphite-filled PFA coating (without primer) showed improved adhesion to the substrate, which can be seen from FIG. 5c where the pile-ups of the coating material were only observed at the edges of the track with limited extension to the surrounding regions. Also, no delamination of the coating layer from the substrate was observed near the track region, which is quite different from the pure PFA coating.

When a primer was applied and the coating thickness was increased to ~200 µm, the adhesion strength was greatly enhanced. From FIG. 5d it is seen that no delimitation occurred even near the scratch track, which means that the coating layer was plastically deformed and grooved while the adhesion to the substrate was not broken. A significant difference from the other two coatings is that a much deeper and wider track is formed. This is a result of the much deeper ploughing of the indenter on the much thicker coating layer, causing much more coating material removal around the indenter tip. The material pile-ups along the track are also different: here the pile-ups were found to be along the tracks only (no extension to the sides).

Due to the small coating thickness (45~60 µm) of the samples without primer (FIGS. 5a and 5c), the indenter scratched the substrates shortly after applying the load. As a result, clear scratches on the metal substrate are visible in the pictures (white lines in FIGS. 5a and 5c). By contrast, the scratch made on the bilayer thick coating (FIG. 5d) did not penetrate to the substrate much, thus the center line in the track is not obvious.

Figure 6:
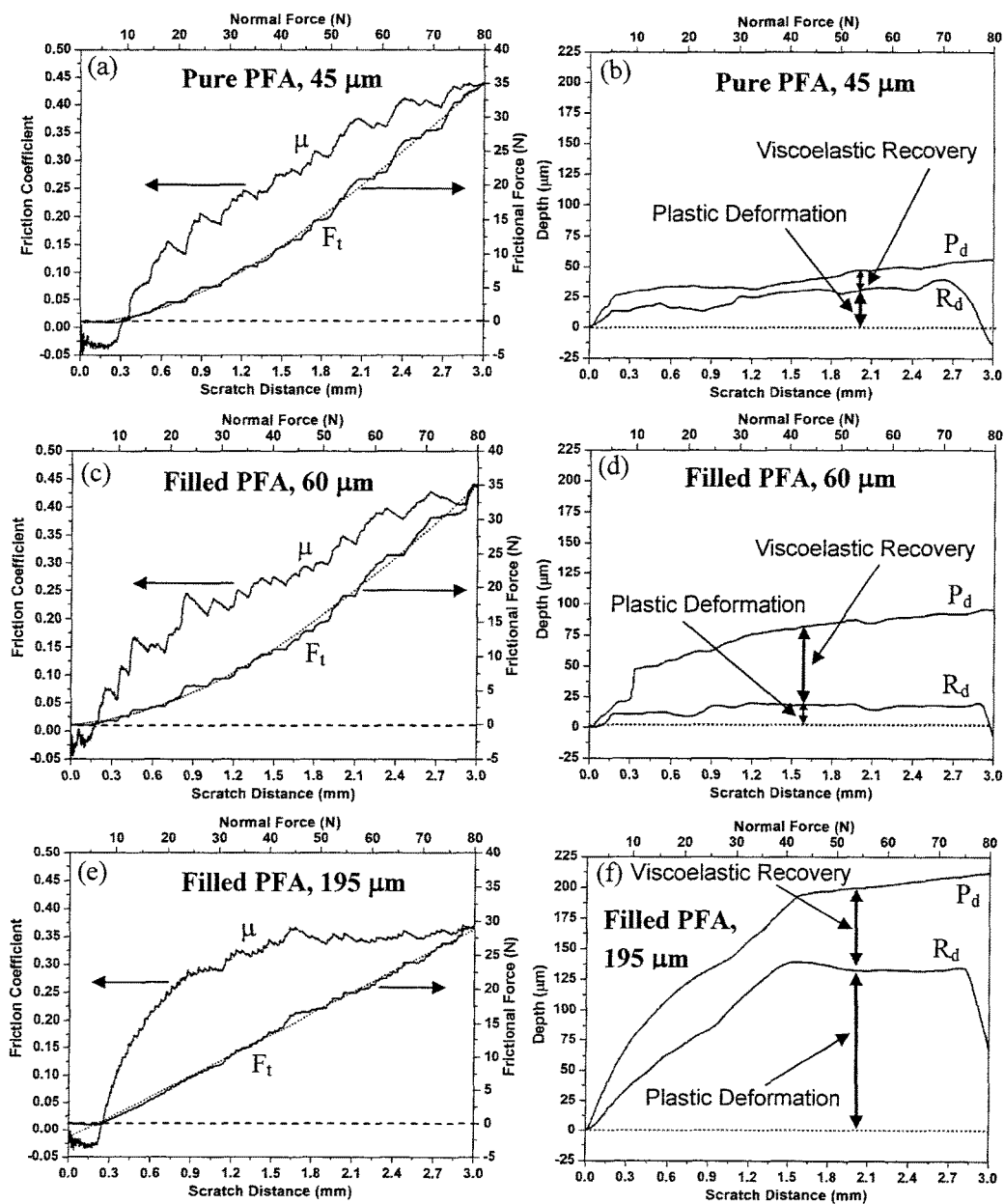
FIG. 6 illustrates scratch results for progressive load testing on the three samples: (a), (c), (e) frictional force and apparent friction coefficient, and (b), (d), (f) penetration depth and residual depth for samples 1, 2 and 3, respectively.

FIG. 6 shows the measured frictional force, apparent friction coefficient, penetration depth and residual depth plotted as a function of the scratch distance and applied normal force. At the early stage of the scratch (0~0.3 mm), the frictional force is both negative and positive, showing apparent fluctuations. This is caused by the initial contact of the indenter tip with the discrete asperities of the coating surface at the beginning of the test, as well as by the sudden speed change (from 0 to 3 mm/min) of the indenter tip. After that, the frictional force increases gradually as the normal force increases. For the thin monolayer coatings (FIGS. 6a and 6c), the frictional forces increase approximately as a third order polynomial function with the normal force and reaches a maximum of ~35 N when the applied normal load is 80 N. For the thick coating (FIG. 6e), it increases almost linearly with the normal force and the maximum is about 28 N.

The ratio of the tangential force to the normal force ($\mu = Ft/Fn$) is termed as apparent friction coefficient and it consists of two additive parts: one related to conventional interfacial friction and the other associated with material deformation. Due to the slippery nature of PFA, the conventional part of the apparent friction coefficient is very low, thus the apparent friction coefficient is dominated by the material resistance. It is clear from FIGS. 6a and 6c that, for the two thin coatings, the indenter scratched the metal substrate shortly after applying the normal force, which is evidenced by the large fluctuations in the apparent friction coefficient. The fluctuation was a result of the stick-slip motion between the indenter tip and the metal substrate as well as the drag-release action of the indenter on the soft coating layer near the track.

By contrast, the apparent friction coefficient for the thick coating (FIG. 6e) does not show such big fluctuations. The small visible oscillations are also caused by the stick-slip phenomenon, but in a much smaller scale since in this case the tangential force mainly arises from the coating material, not from the substrate.

From FIGS. 6a and 6c it is also clear that the apparent friction coefficients of the thin monolayer coatings increase continuously with the applied normal load, due to the scratch of the indenter onto the metal substrates. For the thick bilayer coating (FIG. 6e), the apparent friction coefficient increases rapidly at the beginning of the scratch, then gradually becomes a constant after the normal load reached about 40 N. Since no delamination of the coating from the substrate occurred, the measured apparent friction coefficient reflects the deformation resistance of the coating material.

It has been mentioned before that the polymeric material shows obvious viscoelastic characteristics during the indentation testing. This can also be seen in the scratching depth results shown in FIGS. 6b, 6d and 6f. The residual depth (Rd) recorded during the scratch test is a measure of the viscoelastic relaxation of the material. It is clear that the pure PFA coating (FIG. 6b) has a much lower viscoelastic recovery rate than the filled PFA coatings (FIGS. 6d and 6f), which means that by adding graphite to PFA the coating is more resistant to scratch as the deformation is more easily recovered.

Wear Testing

In order to characterize the effect of graphite addition on the tribological properties of the PFA coating, wear testing was performed on the graphite-filled PFA coating sample (60 μm, no primer). The tribological testing was conducted using a pin-on-disk method. A 6-mm 100Cr6 steel ball was utilized as the static partner and a load of 10 N was applied at a linear speed of 10 cm/s. After the wear test, the wear track (with a radius of 4.05 mm) was scanned with a profilometer to determine the volume of material removed, and based on which the sample wear rate was calculated.

Figure 7:
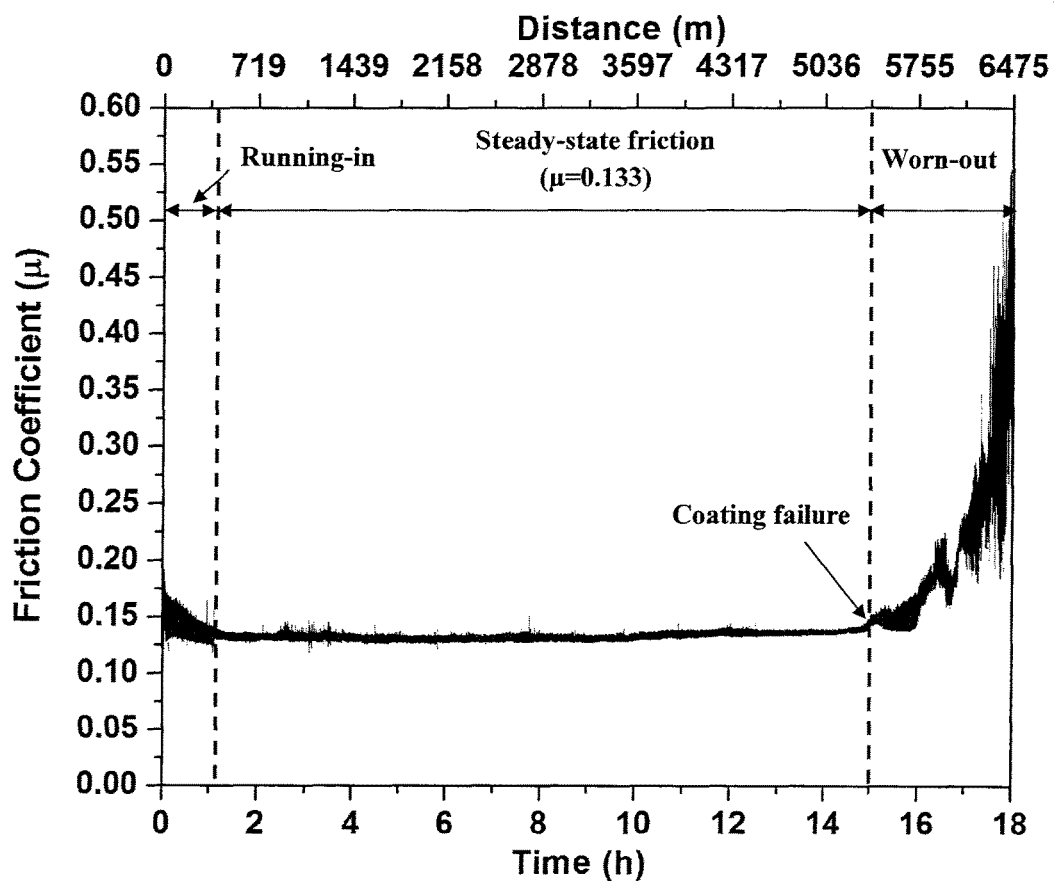
FIG. 7 illustrates wear testing data of the graphite-filled PFA coating on stainless steel substrate, the coating failed after a distance of ~5.4 Km or ~15 hours.

FIG. 7 illustrates the tribological results obtained from the pin-on-disk test made on the graphite-filled PFA coating. The friction coefficient is plotted against the time elapsed and the distance covered (L) during the wear test. Three distinguished sections of the friction coefficient can be noticed in the entire distance. The initial portion of the data (L=400 m) represents the running-in period of the two surfaces. The second portion is the steady-state wearing of the two surfaces running smoothly over each other with a steady friction coefficient.

For the graphite-filled PFA coating, the friction coefficient was measured as $\mu=0.133$, which is close to the value of pure PFA on steel (0.1~0.2). Due to the low friction coefficient, the test lasted for about 15 hours before the failure of the coating and a distance of 5.4 Km was covered. The last portion is the worn-out of the coating layer, which shows an abrupt increase of the friction coefficient, indicating the rubbing between the static partner and the metallic substrate.

Pull-Off Adhesion Strength Testing

The adhesion strength of coated coupons was tested using an Elcometer Model 106 Adhesion Tester (EN13144, ISO 4624 and ASTM D 4541). A testing dolly was adhered to the coating surface using an Araldite epoxy adhesive, and the coating area under the base of the dolly was separated from the rest of the coating by using a dolly cutter. The dolly was then applied by a tensile stress to pull the coating off the substrate and the stress was recorded as an indicator of the adhesion strength.

Four coupons with 10%, 20%, 30% and 40% weight percentage graphite were tested. The coatings with 10%, 20% and 30% graphite showed better adhesion strength than the epoxy adhesive between the dolly and the coating as the epoxy adhesive failed before the PFA coating was removed from the substrate. The recorded stress for all the three samples was 2 MPa, which was the adhesion strength between the dolly and the coating surface, not that between the PFA and the substrate (which should be higher). The pre-failure of the epoxy adhesive was mainly due to the non-sticky nature of PFA, which caused the poor adhesion between the dolly and the coating. The 40% graphite coating has a very rough surface which makes the adhesion between the dolly and the coating much stronger. This sample failed at a stress of 2.5 MPa, but the failure occurred in the coating itself, not at the substrate. This was due to the high amount of graphite which degraded the integrity of the composite coating. Thus in practice the graphite filler should be preferably controlled within 30 wt % for good coating quality.

Thermal Conductivity of Graphite-Filled PFA

The thermal conductivity of graphite-filled PFA was measured by a laser flash method. Disk samples of Φ12.7×2 mm were prepared using the post-blended PFA powder by compression moulding. Samples with various graphite contents (10%, 20%, 30%, 40% and 50%, by weight) have been prepared and tested. The thermal diffusivity was directly measured through the thickness of the disk. The specific heat was measured by Differential Scanning calorimetry (samples of 30, 40 and 50 wt % graphite) or a flash method (samples of 10 and 20 wt % graphite) by comparing the temperature rise of the sample to the temperature rise of a reference sample of known specific heat tested under the same conditions. The thermal conductivity was then calculated based on the measured thermal diffusivity, specific heat and bulk density as:

Thermal Conductivity=Thermal Diffusivity·Specific Heat·Density

The thermal diffusivity and specific heat were measured at temperatures from ambient up to 225° C.

Figure 8:
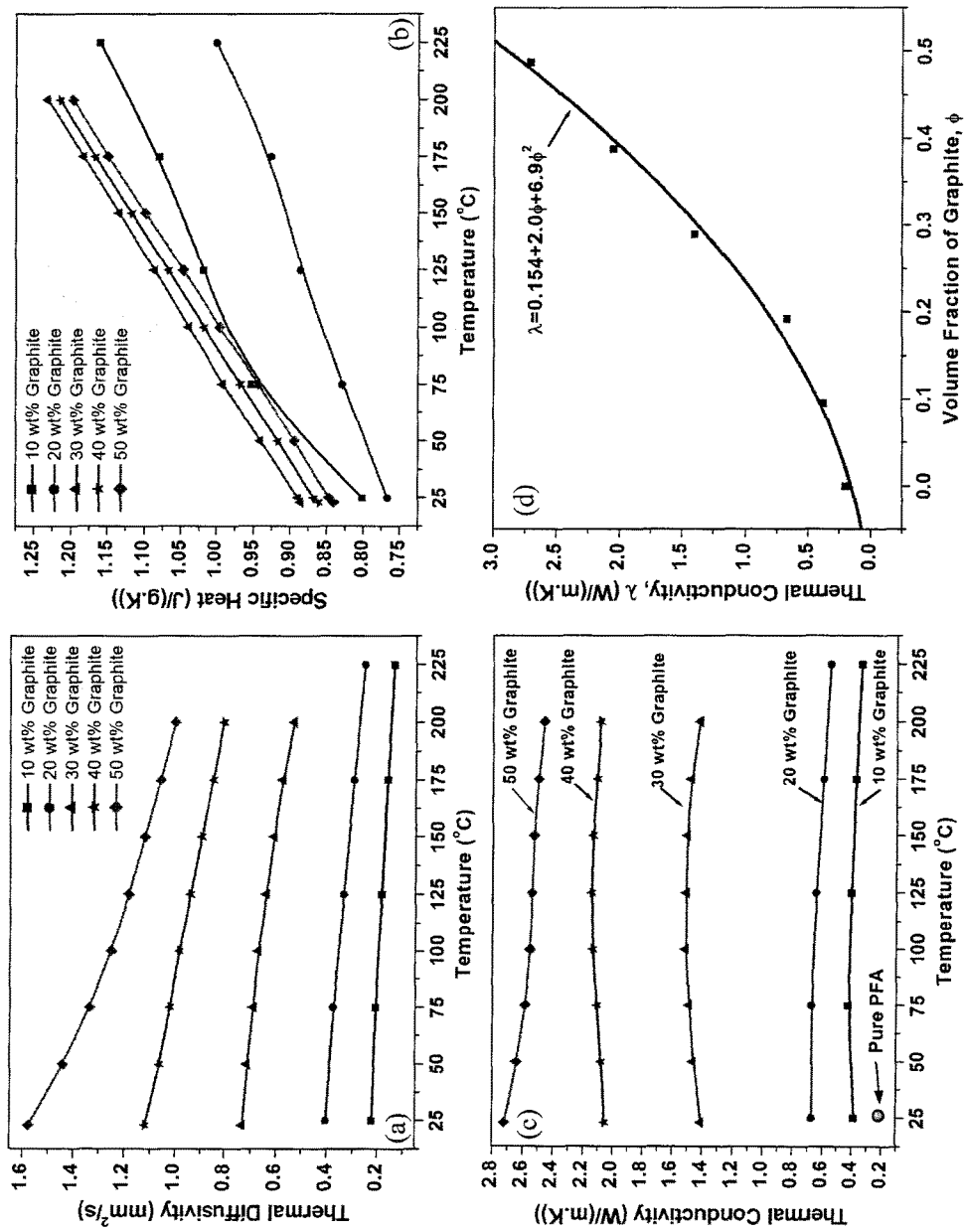
FIG. 8 illustrates thermal properties of graphite-filled PFA at various temperatures: (a) thermal diffusivity, (b) specific heat, (c) thermal conductivity, and (d) dependence of the composite thermal conductivity on filler volume fraction.

FIG. 8 illustrates the measured thermal diffusivity, specific heat and thermal conductivity at various temperatures, as well as the relationship between the thermal conductivity and the graphite content. It can be seen that the thermal diffusivity increases with the amount of graphite and so does the thermal conductivity. The specific heat increases with increasing temperature, while the thermal diffusivity slightly decreases with the temperature. As a result, the thermal conductivity slightly changes with the temperature at each graphite content.

By adding 10% and 20% (wt) graphite into the pure PFA, the thermal conductivity was increased by a factor of ~2 and ~3, respectively. It is generally true that a higher percentage of thermally conductive filler will result in a higher composite thermal conductivity, provided that the concentration is within the maximum packing fraction. When the graphite content was increased to 50 wt %, the thermal conductivity was increased by more than an order of magnitude from 0.2 $Wm^{-1}K^{-1}$ to 2.7 $Wm^{-1}K^{-1}$. Based on the measured data, the relationship between the thermal conductivity of graphite-filled PFA and the volume fraction of graphite can be approximated as (FIG. 8d):

$$\lambda=0.154+2.0\phi+6.9\phi^2$$

where $\lambda$ is the thermal conductivity in $Wm^{-1}K^{-1}$ and $\phi$ is the volume fraction of graphite.

Heat Transfer Efficiency of PFA-Coated Tubes

Polymer linings/coverings on heat exchanger tubes have always suffered from heat transfer penalties due to their low thermal conductivity compared to metals. Although the thermal conductivity of the polymeric lining/covering material itself is one of the main factors affecting the overall heat transfer of the covered tube, in many cases the thermal contact resistance at the polymer/metal interface also has a major influence. This is due to the fact that the engineering surfaces of metallic tubes are never perfectly smooth, thus the contacting surfaces between the lining/covering and the tube are not completely conforming. Heat transfer across the interface can take place both through the surface asperity micro-contacts and the air-filled micro-gaps. The thermal contact resistance across the film-tube interface is composed of two sets of parallel thermal resistances: constriction/spreading resistance and micro-gap resistance.

If a polymer film was applied onto the metallic tube surface by, e.g. heat shrink covering, the real contact area between the covering film and the metal tube is substantially smaller than the apparent contact surface area due to the limited contact pressure induced by the shrinking. However, if the polymer film was formed by a coating process, e.g. electrostatic powder coating, during the coating process, the sprayed PFA powder was sintered at a high temperature at which the polymer melts and flows into the crevices on the tube surface and fills the gaps. This would result in a significantly increased contact surface area between the coating and the tube. This is especially true when an adhesive primer was applied before the top coating, which gives a much better adhesion to the substrate.

Figure 9:
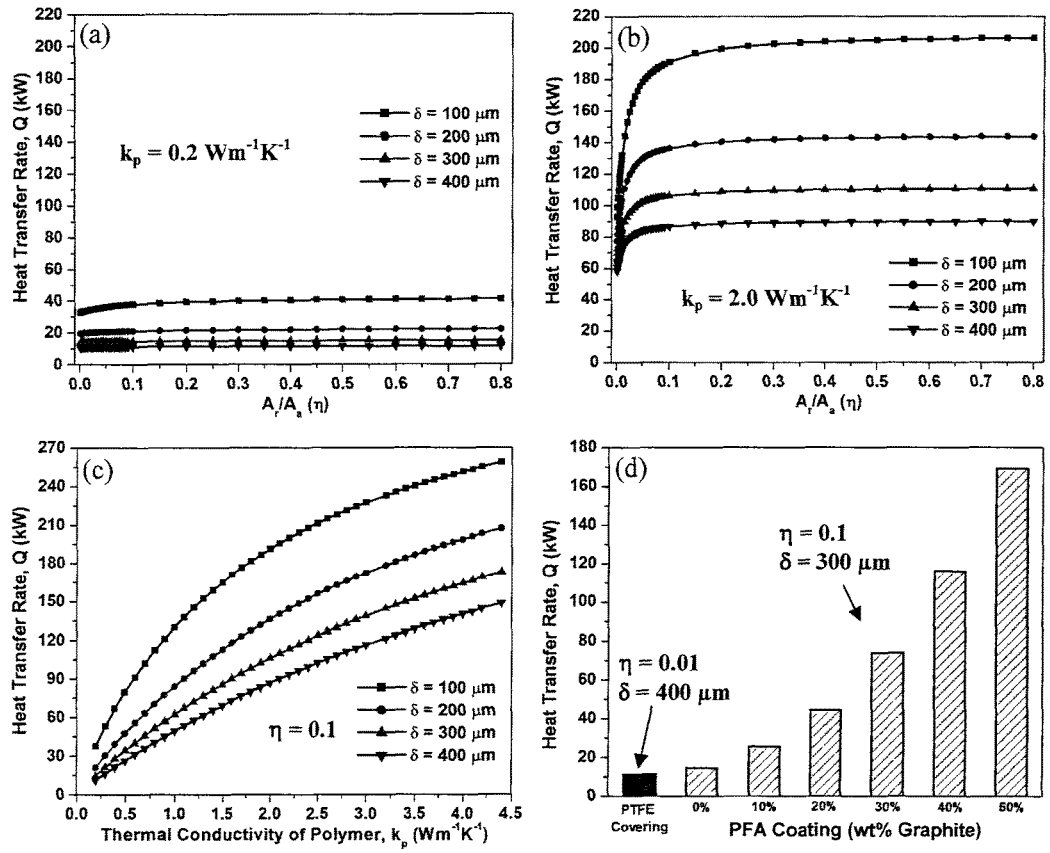
FIG. 9 illustrates effects of real contact area and polymer thermal conductivity on the overall heat transfer rate of a polymer-coated tube: (a) and (b) effect of the ratio of the real contact area to apparent contact area, (c) effect of polymer thermal conductivity, (d) combined effect.

Based on a modified thermal contact resistance model, FIGS. 9a and 9b illustrate the effect of the real contact area on the heat transfer rate at various film thicknesses and polymer conductivities. It is clear that the effect of real contact area on the heat transfer rate is perceptible only when the ratio η of the real contact area to the apparent contact area is less than about 10% and the effect is highly dependent on the thermal conductivity of the polymer. With a low thermal conductivity (0.2 Wm$^{-1}$K$^{-1}$), the overall heat transfer rate is very low, and increasing the real contact area will not appreciably increase the heat transfer rate. If the thermal conductivity of the polymer is increased by an order of magnitude (which can be realized by filling ~40 wt % graphite into pure PFA powder), the overall heat transfer rate can be increased by an order of magnitude as well. FIG. 9c shows the trend of the overall heat transfer rate with the increase of polymer thermal conductivity. As expected, the higher the polymer conductivity, the higher the overall heat transfer rate.

FIG. 9d shows the total heat transfer rates that can be achieved by using the coating technology developed in this study, i.e. using coating instead of covering, and filling pure PFA with graphite powder. It was assumed that the PTFE covering had a film thickness of 400 μm and a real contact area ratio of 1%. By PFA coating, the polymer film thickness could be reduced to ~300 μm and the real contact area ratio increased to 10%. If no conductive filler is used, the heat transfer rate can only be slightly increased (~25%). By adding about ~40 wt % graphite into the PFA powder, an order of magnitude increase on the overall heat transfer rate can be achieved.

Coating of Tubes and Finned Heat Exchangers

As an extension to the coating of flat coupons, a number of stainless steel (SS 316) tubes and aluminum heat exchanger plates (with fins) were successfully coated with composites containing 10% to 40% (wt) graphite using the same electrostatic spray method and sintering schemes as the coupons. The finned heat exchangers had fin height of ~25 mm, fin thickness of ~0.6 mm and fin pitch of ~2.3 mm, demonstrating the applicability of the composite material and coating technology to real world finned heat exchangers.

Corrosion Testing at Ambient and Elevated Temperatures

In order to evaluate the corrosion resistance of the composite coating in highly concentrated sulphuric acid, immersion tests of coated coupons in 80% H$_2$SO$_4$ were conducted at both ambient (25° C.) and elevated (85° C.) temperatures. The samples were coated with various amounts of graphite and/or silicon carbide filled PFA and with coating thickness ranging from 140 μm to 609 μm. The test results are summarized in Table 1. As shown in Table, 1, not a single coupon has shown any corrosion (as observed by visual examination and weight measurements) after 240 hours or 1512 hours of immersion at both ambient and elevated temperatures.

TABLE 1

| Sample No. | Filler Material and wt % | Thickness of Coating | H$_2$SO$_4$ Concentration | Immersion Time 85° C. | Immersion Time 25° C. | Corrosion Evaluation |
|---|---|---|---|---|---|---|
| 1 | 20% Graphite | 193 μm | 80% | 160 h | 80 h | No corrosion |
| 2 | 30% Graphite, and 0% (top 24 μm coating) | 300 μm | 80% | 160 h | 80 h | No corrosion |
| 3 | Pure PFA | 140 μm | 80% | 1140 h | 372 h | No corrosion |
| 4 | 10% Graphite | 150 μm | 80% | 1140 h | 372 h | No corrosion |
| 5 | 20% Graphite | 300 μm | 80% | 1140 h | 372 h | No corrosion |
| 6 | 10% SiC and 10% Graphite | 400 μm | 80% | 1140 h | 372 h | No corrosion |
| 7 | 10% SiC | 393 μm | 80% | 1140 h | 372 h | No corrosion |
| 8 | 20% SiC | 609 μm | 80% | 1140 h | 372 h | No corrosion |

Results

Fluoropolymer based composites with improved thermal conductivity were powder coated onto metallic substrates and the surface mechanical and tribological properties of the coatings were characterized by nano-indentation, scratch and wear tests.

By post-blending graphite into PFA coating powder, not only was the thermal conductivity improved, but the coating hardness, elastic modulus and the adhesion strength were also enhanced. With a coating thickness of greater than ~200 μm, the coated metal showed excellent corrosion resistance in concentrated sulphuric acid.

The thermal conductivity of the blended PFA increases with the amount of graphite filler added. It is shown that by blending about ~40 wt % graphite into commercial PFA powders, the thermal conductivity can be increased by an order of magnitude.

The thermal contact resistance at the coating-metal interface was evaluated using a modified analytical model and great enhancement of heat transfer is anticipated by increasing the thermal conductivity of the coating material, reducing the thickness of the coating layer and increasing the real contact area (using coating instead of covering).

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A condensing heat exchanger comprising an enclosure and heat exchanging elements contained therein, said apparatus protected by corrosion resistance composite powder coatings and said heat exchanging elements being made of metallic materials wherein:

a composite comprising at least one first melt-processable fluoropolymer and at least one thermally conductive filler for enhancing thermal conductivity of said first fluoropolymer coats an entirety of external surfaces of said heat exchanging elements, and a composite comprising at least one second melt-processable fluoropolymer coats an entirety of inner surfaces of said enclosure; said composite powder coatings being continuously operable in acidic corrosive environment at elevated temperatures up to 260° C.

2. The condensing heat exchanger of claim 1, wherein said first fluoropolymer comprises at least one fluoropolymer selected from a group consisting of: (1) perfluoroalkoxy (PFA) comprising tetrafluoroethylene and perfluoro (propyl vinyl ether) copolymer, (2) tetrafluoroethylene and hexafluoropropylene copolymer (FEP), (3) tetrafluoroethylene and ethylene copolymer (ETFE), (4) ethylene and chlorotrifluoroethylene copolymer (ECTFE), (5) polyvinylidene fluoride (PVDF), and (6) polychlorotrifluoroethylene (PCTFE).

3. The condensing heat exchanger of claim 1, wherein the at least one thermally conductive filler comprises at least one of graphite, carbon, silicon carbide, tungsten carbide, molybdenum disilicide, boron nitride, aluminum dioxide, chromium oxide, powdered quartz, cerium oxide, zirconium oxide, silicon nitride, and beryllium oxide.

4. The condensing heat exchanger of claim 1, wherein said first fluoropolymer comprises PFA, said at least one thermally conductive filler comprises graphite, and said composite comprises about 10% to about 60% by weight of said graphite.

5. The condensing heat exchanger of claim 1, wherein at least a portion of the apparatus is coated with a plurality of layers of said composite.

6. The condensing heat exchanger of claim 1, wherein said first fluoropolymer comprises PFA, said at least one thermally insulating filler comprises carbon black, and said composite comprises about 10% to about 60% by weight of carbon black.

7. The condensing heat exchanger of claim 1, wherein said second fluoropolymer comprises at least one of: (1) perfluoroalkoxy (PFA) comprising tetrafluoroethylene and perfluoro (propyl vinyl ether) copolymer, (2) tetrafluoroethylene and hexafluoropropylene copolymer (FEP), (3) tetrafluoroethylene and ethylene copolymer (ETFE), (4) ethylene and chlorotrifluoroethylene copolymer (ECTFE), (5) polyvinylidene fluoride (PVDF), and (6) polychlorotrifluoroethylene (PCTFE).

8. The condensing heat exchanger of claim 1, wherein said second fluoropolymer comprises PFA, said at least one thermally conductive filler comprises graphite, and said composite comprises about 10% to about 60% by weight of said graphite.

9. The condensing heat exchanger of claim 1, wherein said first fluoropolymer comprises PFA, said at least one thermally insulating fillers comprises carbon black, and said composite comprises about 10% to about 60% by weight of carbon black.

10. The condensing heat exchanger of claim 1, wherein the at least one second melt-processable fluoropolymer is further filled with at least one thermally insulating filler to decrease thermal conductivity of said at least one second melt-processable fluoropolymer.

11. The condensing heat exchanger of claim 10, wherein said second fluoropolymer comprises PFA, said at least one thermally insulating fillers comprises carbon black, and said composite comprises about 10% to about 60% by weight of carbon black.

* * * * *